Figure 1:
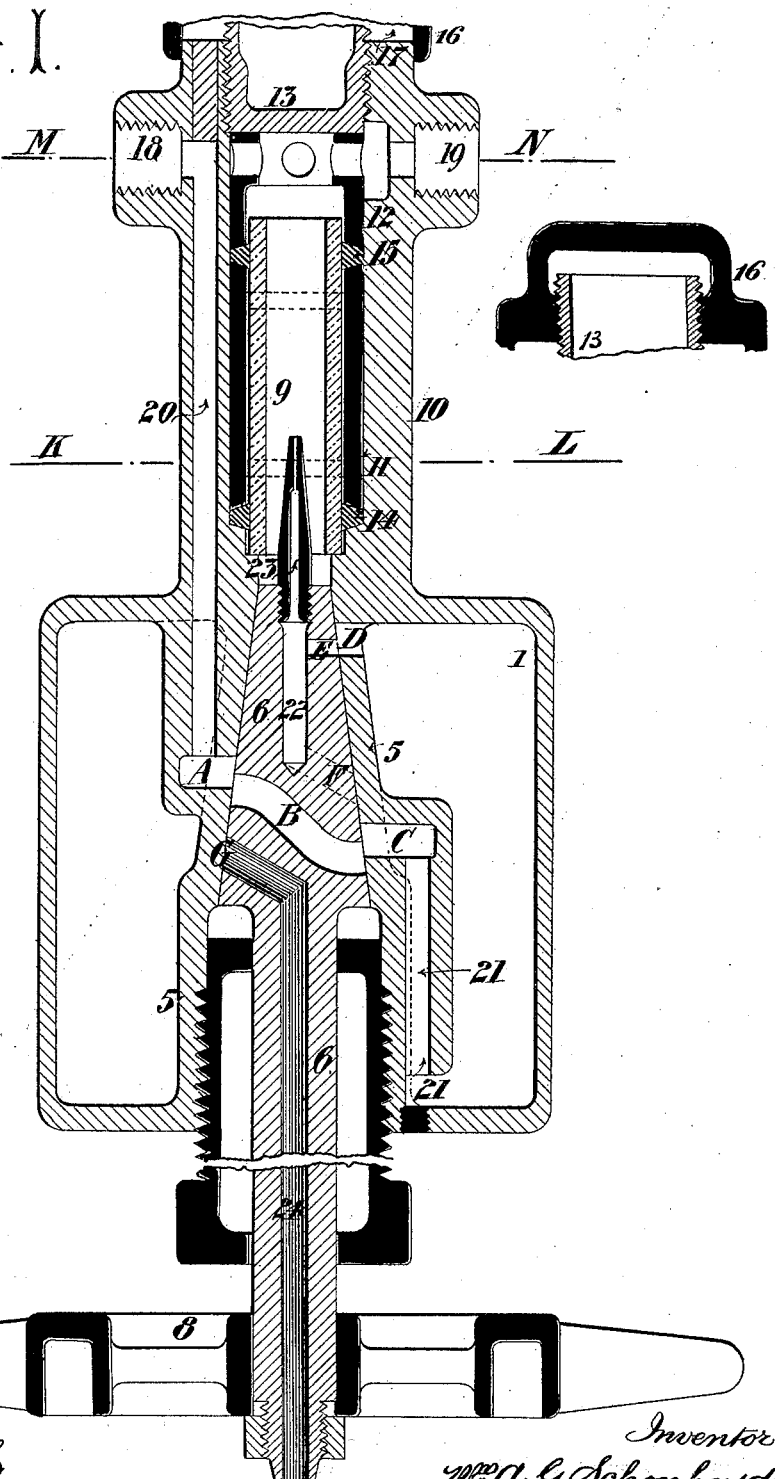

(No Model.)

W. A. G. SCHONHEYDER.
SIGHT FEED LUBRICATOR.

No. 298,898. Patented May 20, 1884.

5 Sheets—Sheet 1.

(No Model.) 5 Sheets—Sheet 3.

W. A. G. SCHONHEYDER.
SIGHT FEED LUBRICATOR.

No. 298,898. Patented May 20, 1884.

Witnesses
Chas H Smith
J Staib

Inventor
Wm A. G. Schonheyder
per Lemuel W. Serrell
atty (No Model.)  5 Sheets—Sheet 4.

W. A. G. SCHONHEYDER.
SIGHT FEED LUBRICATOR.

No. 298,898.  Patented May 20, 1884.

Witnesses
Chas H Smith
J Staib

Inventor
Wm A. G. Schonheyder
per Lemuel W. Serrell
atty (No Model.)

W. A. G. SCHONHEYDER.
SIGHT FEED LUBRICATOR.

No. 298,898. Patented May 20, 1884.

UNITED STATES PATENT OFFICE.

WILLIAM A. G. SCHÓNHEYDER, OF SHEPHERDS BUSH, COUNTY OF MIDDLESEX, ASSIGNOR OF ONE-HALF TO HARRY OLRICK, OF LONDON, ENGLAND.

SIGHT-FEED LUBRICATOR.

SPECIFICATION forming part of Letters Patent No. 298,898, dated May 20, 1884.

Application filed January 30, 1884. (No model.) Patented in England September 5, 1883, No. 4,275.

*To all whom it may concern:*

Be it known that I, WILLIAM ANTON GOTTLIEB SCHÓNHEYDER, a subject of the Queen of Great Britain, residing at Shepherds Bush, in the county of Middlesex, England, have invented new and useful Improvements in Sight-Feed Lubricators, (for which I have obtained a patent in Great Britain, bearing date September 5, 1883, No. 4,275,) of which the following is a specification.

In constructing lubricators for supplying oil or other suitable lubricant to slide-valves, cylinders, or other parts of engines or machines, it is often usual to cause the oil to pass drop by drop through water in a glass tube or other transparent vessel, so that the number of drops fed in a given time can be observed. The oil is forced out of its receptacle by a column of water, which is constantly replenished by condensed steam. In apparatus of this kind, when the receptacle is emptied of oil and filled with water, this water has to be blown off, and fresh oil has to be fed to the receptacle, from which the air has to be discharged; also, from time to time the glass has to be cleaned by blowing through, and when the engine stops the flow of oil has to be arrested. Generally, also, the quantity of oil supplied must be capable of minute regulation. For these purposes separate taps or valves, with numerous joints and connections, are ordinarily employed, and several external pipes with unions are arranged so as to lead the fluid in the desired directions. Now, my invention relates to a construction of lubricator whereby I avoid all these external pipes, valves, or taps and connections, and simplify and cheapen the construction. I make it of cylindrical form, with central glass, and with only two connecting-pipes—one for conveying the condensed steam which expels the oil, and the other for conducting the oil away to the parts that are to be lubricated. Within the cylindrical body of the apparatus I fit an elongated plug, like that of a stop-cock, and provide ports and passages, so arranged that by turning this plug into various positions the necessary communications are effected. For turning the plug, I provide an external handle or wheel, on which, or on a dial, are marked divisions for its different positions—as, for example, "Feed," "Water," "Drain," "Fill," or the like.

Figure 2:
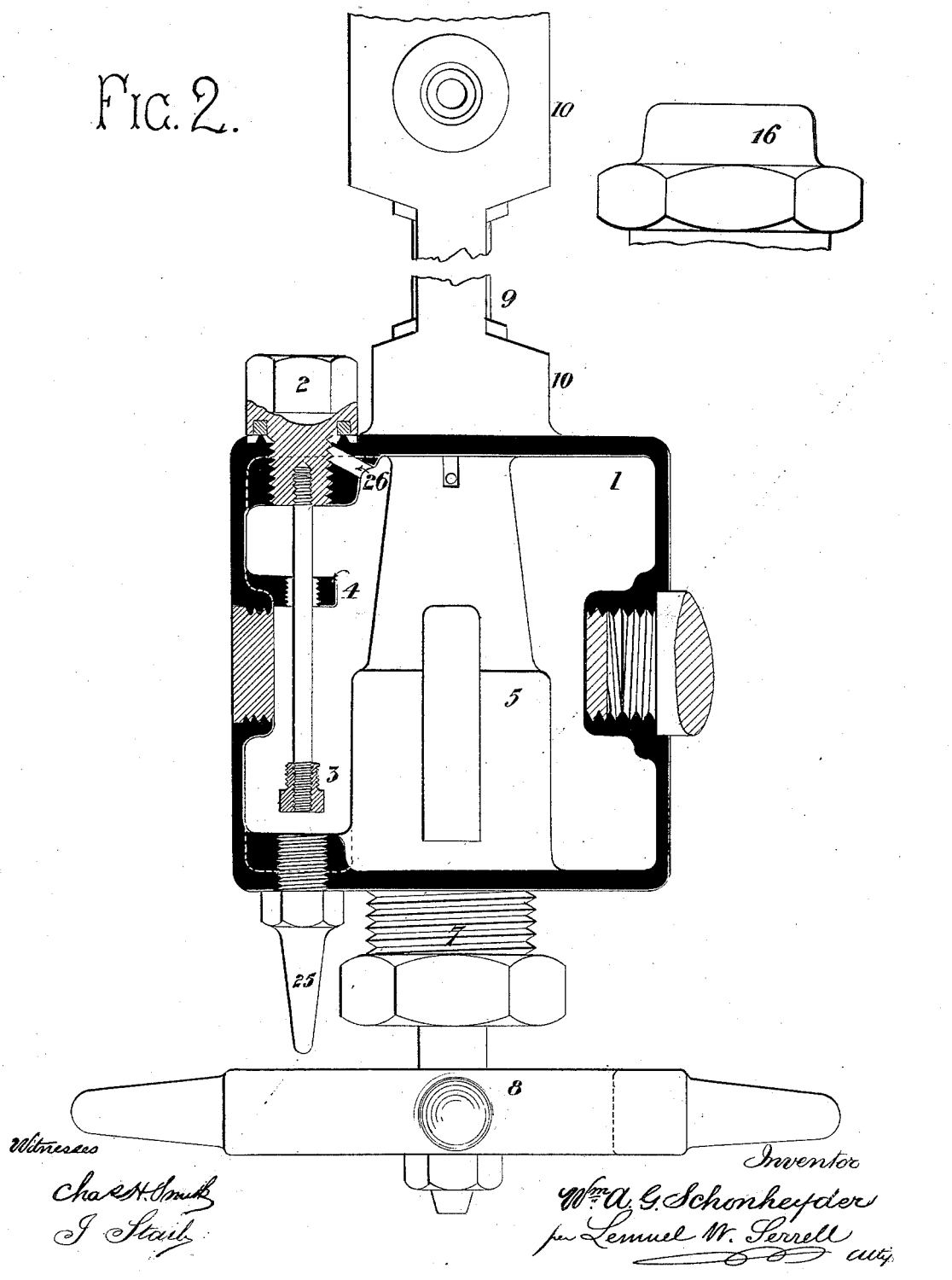
Figure 3:
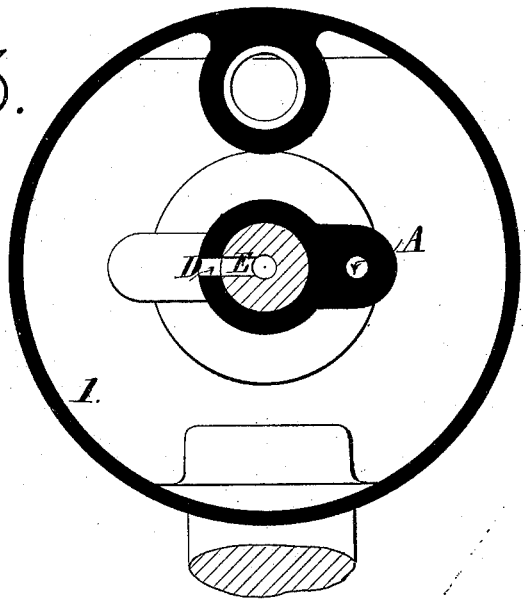
Figure 4:
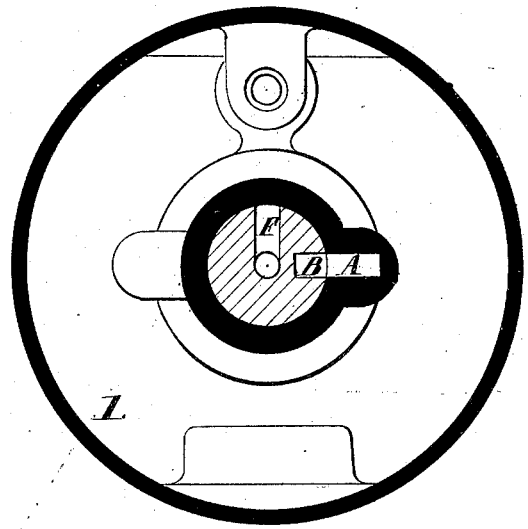
Figure 5:
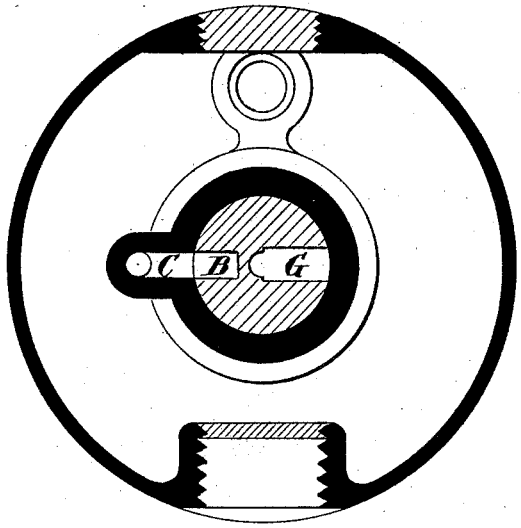
Figure 6:
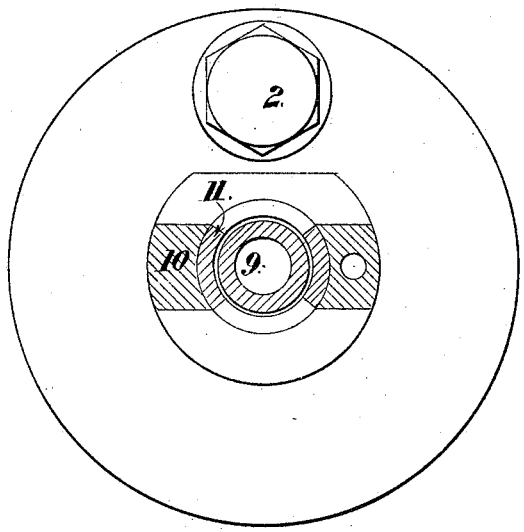
Figure 7:
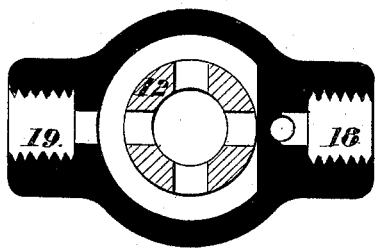
Figure 8:
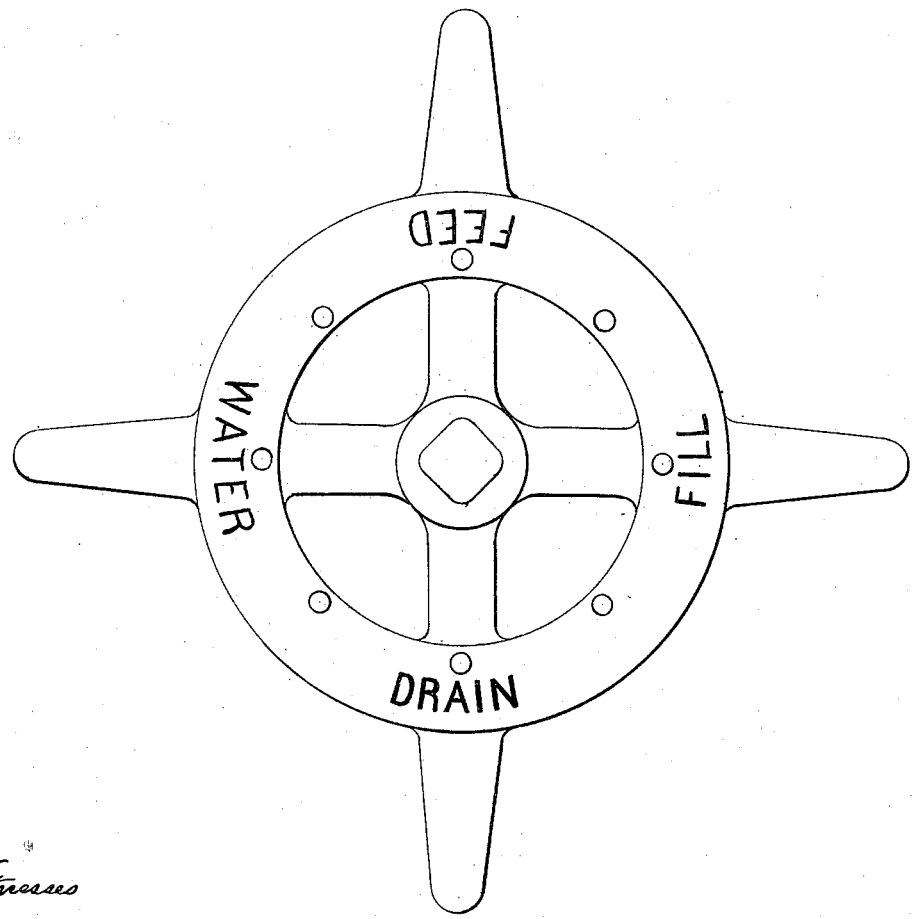

In the accompanying drawings, Figure 1 is a longitudinal section through a lubricator constructed according to this my invention; Fig. 2, a part sectional side view of same at right angles to Fig. 1. Fig. 3 is a vertical cross-section at the parts E and D, Fig. 1; Fig. 4, a similar section at the parts A, B, and F; Fig. 5, a similar section at the parts G, B, and C; Fig. 6, a similar section on line K L; Fig. 7, a similar section on M N; and Fig. 8, a plan view of the hand-wheel, which serves to control the action of the lubricator.

1 is the cylindrical body part for containing the oil or other lubricant, and which is supplied to it through the hole shown sealed by the screw-stopper 2, Figs. 2 and 6. The said stopper 2 is formed with an annular recess for a white-metal seat, which is forced in contact with a corresponding narrow annular seat in the body 1, when the lubricator is to be set to work. When, however, it has to be emptied of water and refilled with oil, the stopper 2 is unscrewed, lifted a short distance, and the enlarged screw 3 on the end of its attached spindle is threaded into the tapped projection 4. By this means the stopper is secured in an elevated position convenient for filling the lubricator; and it is also obvious that the stopper cannot be mislaid or lost.

26 is a passage for letting the air out of the reservoir while it is being filled up.

5 is an internal conical portion of the body for receiving the cock-plug 6 and stuffing-box gland 7.

8 is the hand-wheel for turning the plug 6 to any desired position.

9 is the "glass," secured into the cylindrical projection 10 on the top of the body 1.

11 and 12 are packing-rings, and 13 is a nut for confining the rubber (or other suitable) packing-pieces 14 and 15.

16 is a cap for holding in the packing 17, to prevent leakage past the screw-thread of the nut 13.

18 is the inlet for the water, and 19 is the outlet for the oil.

The various passages and ports are clearly shown in the various sections, the position of the cock-plug 6 being such that when oil is being supplied to the engine the word "Feed" on the hand-wheel 8 is opposite the pointer 25.

From the inlet 18 the water passes by the vertical passage 20 to the port A; thence through the passage B in the plug and the port C and passage 21 into the body part 1. The oil floating on the top of the water will at the same time be forced out through the port D into the port E, and by the passage 22, through the nozzle 23, which is shown to project some distance into the glass tube 9, and thence to outlet 19. The oil escapes from the said nozzle drop by drop at intervals, accordingly as the communication between ports D and E is regulated by turning the hand-wheel 8 and plug 6, and the drops are clearly visible in the glass 9 by reason of part of the cylindrical projection 10 being cut away at opposite sides, as shown. When the oil is exhausted, the hand-wheel is turned halfway round, so as to bring "Drain" under the pointer 25, and this movement will have caused the ports A and D to be closed, while the port C will be open to the port G and to the central outlet-passage, 24. As soon, now, as the screw-stopper 2 is released, so that air can enter into the body part or reservoir 1, the water in the body part 1 will commence to drain away by the passage 21, ports C and G, and central passage, 24. When all the water has been drained out, the tap is turned a quarter of a turn to the position marked "Fill," when all the ports will be closed, and oil can then be poured in, the stopper 2 having first been raised, so that the screwed part 3 enters the screw-thread in the lug 4, as previously described. When it is desirable to cleanse the glass, or to replenish it with water, (to make up for the loss by leakage or otherwise,) the hand-wheel is turned, so that the word "Water" comes opposite the pointer 25. The port F (shown dotted in Fig. 1) will then be opposite the port A, all the other ports being closed. It is now evident that water will flow from inlet 18 through passage 20, port A, port F, and passage 22, and by the nozzle 23 into the glass tube, thus effecting the desired object. All ports will be closed when the plug is half-way between any of the four main positions.

The drawing illustrates the lubricator in a simple and practical form; but I may remark that the filling and the draining-off may be accomplished by adding ports and passages while doing away with the stopper 2; but such an arrangement I find to be complex, without offering adequate advantages.

I claim—

1. A sight-feed lubricator consisting of a reservoir provided with condense-water inlet, and having a cock-casing and cock provided with index and pointer, the said cock being formed with a water-outlet and with an outlet for the oil, to a glass sight-tube communicating with the reservoir, and with the oil feed-pipe to the engine, the cock and casing being formed with ports and passages for putting the oil in the reservoir in communication with the oil-outlet, for putting the water in the reservoir in communication with the water-outlet or with the condense-water inlet, and for closing the cock toward the interior of the reservoir, means being also provided for letting air into the reservoir and for charging it with oil, substantially as and for the purposes set forth.

2. In a sight-feed lubricator, the reservoir 1, with cock-casing 5 and cock-plug 6, provided with index and pointer, and having water-outlet 24 and outlet 22 23 for the oil, which enters a glass sight-tube, 9, arranged in a neck continuation, 10, of the reservoir 1, and communicating with the oil feed-outlet 19 to the engine, the said neck continuation 10 being provided with condense-water inlet 18 and passage 20, the cock 6 and casing 5 being formed with ports and passages A B C, for admitting condense water to the reservoir-ports D and E, for discharging the oil from the reservoir to the sight-tube 9 and outlet 19, passage F, for admitting water from the passage A into the glass sight-tube to clean it, and the passage G, for discharging the water from the reservoir into the water-outlet 24, the reservoir being provided with screw-stopper 2, for letting air into the reservoir and for charging it with oil, substantially as described.

3. In lubricators, the stopper 2 with spindle continuation, having enlarged screwed end 3, in combination with a correspondingly-screwed lug, 4, in the lubricator, substantially as and for the purposes set forth.

W. A. G. SCHÖNHEYDER.

Witnesses:
 F. JENSEN,
 E. W. ECAILLE,
  33 *Chancery Lane, London.*